Sept. 5, 1961 L. A. ULE 2,999,202

VOLTAGE DIVIDER SETTING DEVICE

Filed June 4, 1956 6 Sheets-Sheet 1

INVENTOR.
LOUIS A. ULE
BY
[signature]
ATTORNEY.

Sept. 5, 1961 L. A. ULE 2,999,202

VOLTAGE DIVIDER SETTING DEVICE

Filed June 4, 1956 6 Sheets-Sheet 2

INVENTOR.
LOUIS A. ULE

BY

ATTORNEY.

Sept. 5, 1961 L. A. ULE 2,999,202

VOLTAGE DIVIDER SETTING DEVICE

Filed June 4, 1956 6 Sheets-Sheet 3

INVENTOR.
LOUIS A. ULE

BY

ATTORNEY.

Sept. 5, 1961

L. A. ULE 2,999,202

VOLTAGE DIVIDER SETTING DEVICE

Filed June 4, 1956

6 Sheets-Sheet 4

INVENTOR.
LOUIS A. ULE
BY
[signature]
ATTORNEY.

INVENTOR.
LOUIS A. ULE
BY
[signature]
ATTORNEY.

Sept. 5, 1961 L. A. ULE 2,999,202

VOLTAGE DIVIDER SETTING DEVICE

Filed June 4, 1956 6 Sheets-Sheet 6

INVENTOR.
LOUIS A. ULE
BY
[signature]
ATTORNEY.

United States Patent Office 2,999,202
Patented Sept. 5, 1961

2,999,202
VOLTAGE DIVIDER SETTING DEVICE

Louis A. Ule, Alhambra, Calif., assignor to Gilfillan Bros. Inc., Los Angeles, Calif., a corporation of California Filed June 4, 1956, Ser. No. 589,032
4 Claims. (Cl. 323—74)

This invention relates to potentiometers and, more particularly, to means for selectively setting one or more voltage dividers to any one of several corresponding groups of settings.

The problem of setting a potentiometer rapidly and correctly occurs most often when it must be frequently set to any one of several "standard" settings. In this case, an operator of electrical apparatus including voltage dividers is often likely to make setting mistakes due simply to the monotony of the setting procedure. This is especially true when each of ten or even one hundred potentiometers must be frequently set to one of, for example, five alternative groups of settings. In such a case, the tedium of setting all the potentiometers is increased by the requirement to turn each one to a corresponding setting for any one particular group of settings. Generally, the operator must visually check to see if the setting of each particular potentiometer is correct and manually correct the setting if there is an error.

The present invention overcomes these and other disadvantages of the prior art by providing a plurality of circuits, a plurality of impedance elements corresponding to each circuit, a shorting element for each of the impedance elements, at least one individual pair of terminals in one of the circuits for each of the impedance elements, and a member having isolated areas corresponding to the respective mechanical positions of each of the pairs of terminals, the areas having a construction different from that of the remaining area of the member to complete each of the circuits by connecting one or more of the elements between each of the pairs of terminals and by connecting a shorting element between the remainder of the pairs of terminals. According to a feature of the invention, means may also be provided to align the member with any selected one of several groups of the isolated areas in the positions of the terminals. In this case, a minute shift in the transverse position of the member, which may be, for example, a drum having depressions or recesses therein or a card having perforations therein, may be employed to set any number of potentiometers simultaneously. That is, the perforations or depressions may be positioned in a manner such that by manually adjusting the position of the member, in a few seconds an unusually large number of potentiometers may be set precisely to corresponding settings by a simple manual adjustment made by a single operator. The isolated areas on the member may also be shorting elements, impedance elements, or other conductive materials printed or etched on it. The word "conductive" is employed to encompass both resistive impedance elements and shorting elements. Alternatively, the isolated areas may be perforations in the member to permit shorting bars or switch-actuating pins to project therethrough and short out certain selected impedance elements.

According to the invention, an arrangement is also provided comprising a plurality of circuits, a plurality of impedance elements corresponding to each circuit, a switch mechanism for each impedance element to connect any one or more of the impedance elements into the corresponding circuit of each, each of the switch mechanism including an actuating pin, at least a portion or bank of the switches being disposed in a single plane, the actuating pins of the bank of switches having parallel axes, a perforated card, first means to maintain the card in any one of several transverse positions in a plane parallel to that of the switch bank, whereby the total impedance of each of the circuits may be fixed according to one of several alternative positions, and second means to clamp the card to the bank of switches, whereby selected actuating pins may project through the perforations of the card and others are moved effectively by the lack of perforations at the reltaive positions of said other actuating pins. If desired, the first means may comprise a horizontally disposed channel to receive the lower edge of the card, position means, the card being adapted to receive the position means, whereby the card may be accurately aligned in any selected one of the several alternative positions.

According to another feature of the invention a special switching device is provided to complete each of the two above mentioned circuits simultaneously not only by the serial connection of one impedance element in one circuit, but also by the serial connection of a shorting bar in the other. This embodiment of the invention may include first and second input terminals, an output terminal, a plurality of switch mechanisms providing connections from the first and second input terminals, respectively, to the output terminal, each of the switch mechanisms comprising a member to carry an impedance element and first and second shorting bars spaced respectively from each side of the impedance element, each of the switch mechanisms having only two stable mechanical positions, one of the positions being appropriate to connect an impedance element serially with the second circuit and to connect a corresponding first shorting bar serially with the first circuit and to connect a corresponding second shorting bar serially with the second circuit.

Although, as will be explained subsequently, any one of several circuits may be employed to derive a fraction of a voltage or current while presenting different impedances to a potential source and a load impedance, the invention may be employed as a substitute for a conventional potentiometer that provides variable attenuation for an input voltage and provides a constant impedance to a potential source supplying the voltage and a variable impedance to a load. Such device made in accordance with the invention, however, may be made highly accurate, but manufactured easily and economically. Such a device may comprise first and second circuits connected serially to each other across two input terminals, the load being connected in parallel with one of the circuits, and means including a switch mechanism to connect one or more of the impedance elements serially in one of the circuits and to connect the remainder of the impedance elements serially in the other. The impedance elements may, for example comprise binary coded resistors having resistances in the proportion $1:2:4:8: \ldots 2^{p-1}$ where $p$ equals the total number of the resistors. According to this code, the minimum number of resistors are required. However, it will be obvious that many other coding arrangements may be provided. Thus several groups of 9 may be employed having resistances in the proportion $1:2:3: \ldots 9$, each resistor in each group having a corresponding resistance value $10^q$ times that of a corresponding resistor in a group having the lowest resistance, $q$ being defined as: $q=1,2,3, \ldots n$ where $n$ equals the total number of resistor groups.

Fortunately the invention, unlike the conventional potentiometer, is not limited in utility to deriving a fraction of a voltage, but may be employed to derive any selected fraction of a current. Such a device may include a circuit adapted to be connected in parallel with the load, the circuit including a plurality of impedance elements and a switch for each of the elements to selectively connect any one or more of the elements into the circuit to change its total impedance, each of the impedance elements being connected serially with each corresponding switch and each pair of an impedance element and a corresponding switch being connected in parallel with the load.

It is therefore an object of the invention to provide a novel signal translation device which may be easily and economically manufactured for deriving a fraction of an input signal.

It is another object of the invention to provide a circuit responsive to a switch code for producing an output signal proportional to a fraction of an input signal.

Yet another object of the invention is to provide a circuit for producing an output voltage or current proportional to a fraction of an input voltage or current.

A further object of the invention is to provide a novel switching device for selectively connecting an attenuating network to produce an output signal proportional to a fraction of an input signal.

A still further object of the invention is to provide novel means to set each of a plurality of attenuation networks to any selected one of several corresponding groups of settings.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figures 13, 14:
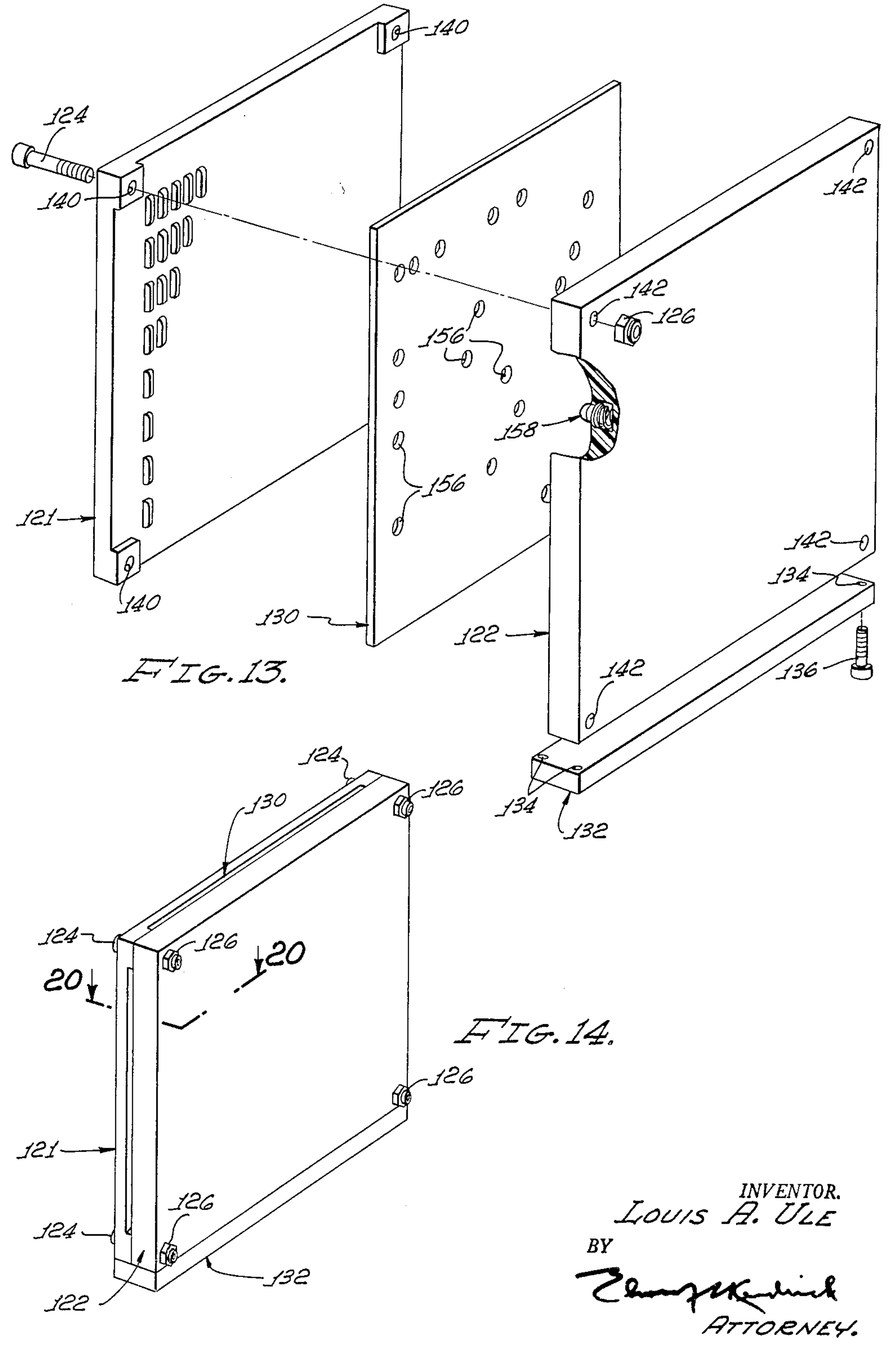
FIG. 13 is a perspective view of another assembled voltage divider setting device constructed in accordance with the invention.
FIG. 14 is an exploded perspective view of the device as shown in FIG. 13.
Figure 15:
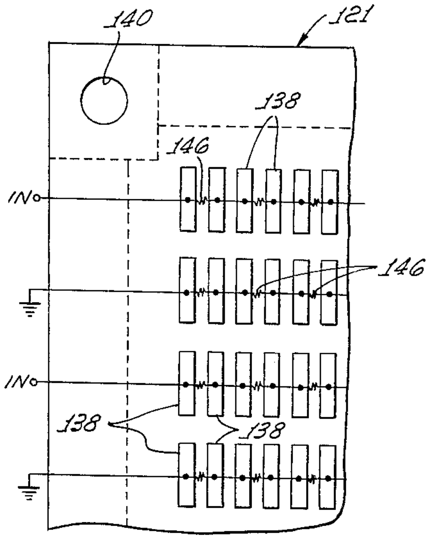
FIG. 15 is a broken away rear elevational view of one of the structures of the device shown in FIGS. 13 and 14.
Figure 16:
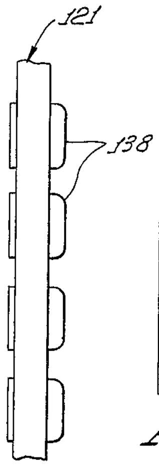
FIG. 16 is a broken away side elevational view of another one of the structures shown in FIGS. 13 and 14.
Figure 17:
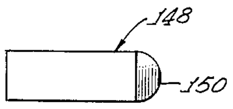
Figures 18, 19:
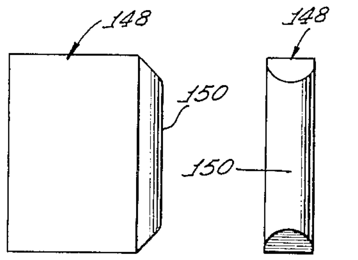
Figures 20, 21, 22:
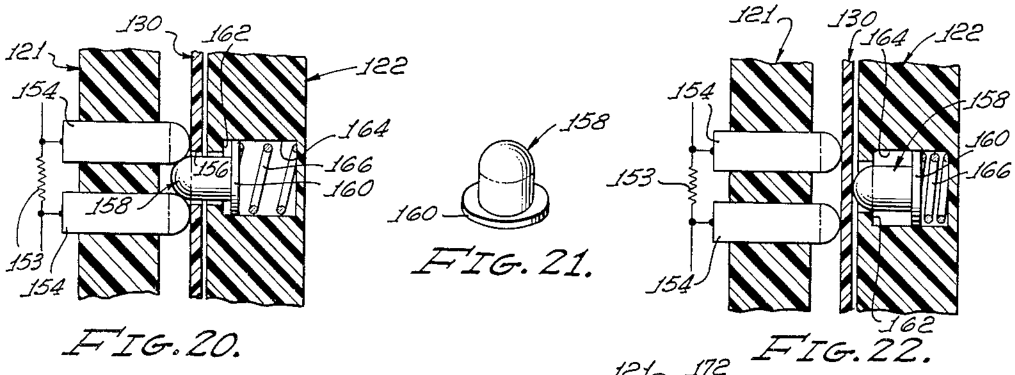
Figure 23:
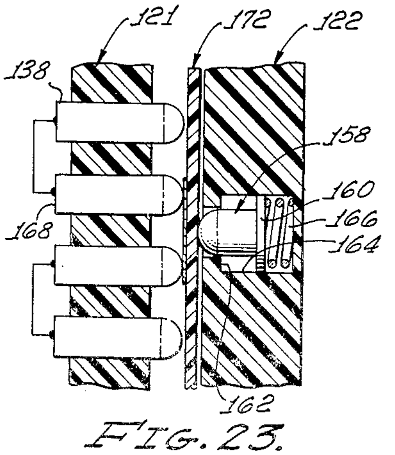
Figure 24:
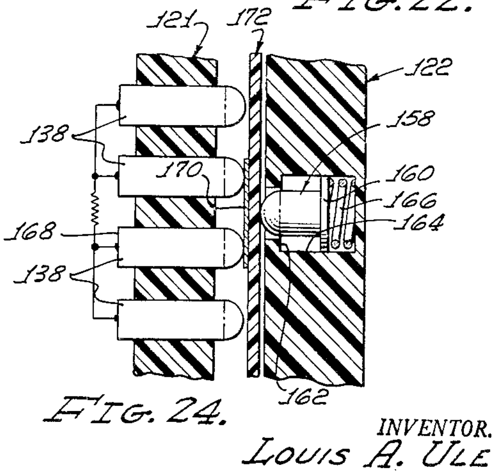

FIGS. 17, 18, and 19 are plan, side, and front elevational views of a shorting terminal employed with the device shown in FIG. 16;

FIG. 20 is a sectional view on the line 20—20 shown in FIG. 13;

FIG. 21 is a perspective view of a shorting element or button illustrated in FIG. 20;

FIG. 22 is a sectional view similar to the section shown in FIG. 20 with a perforated card shown in position between the members shown in FIGS. 15 and 16, respectively, and FIG. 13; and FIGS. 23 and 24 are sectional views of devices similar to that shown in FIG. 13, the sectional views of FIGS. 23 and 24 being analogous to the sectional view shown in FIG. 22.

Figure 1:
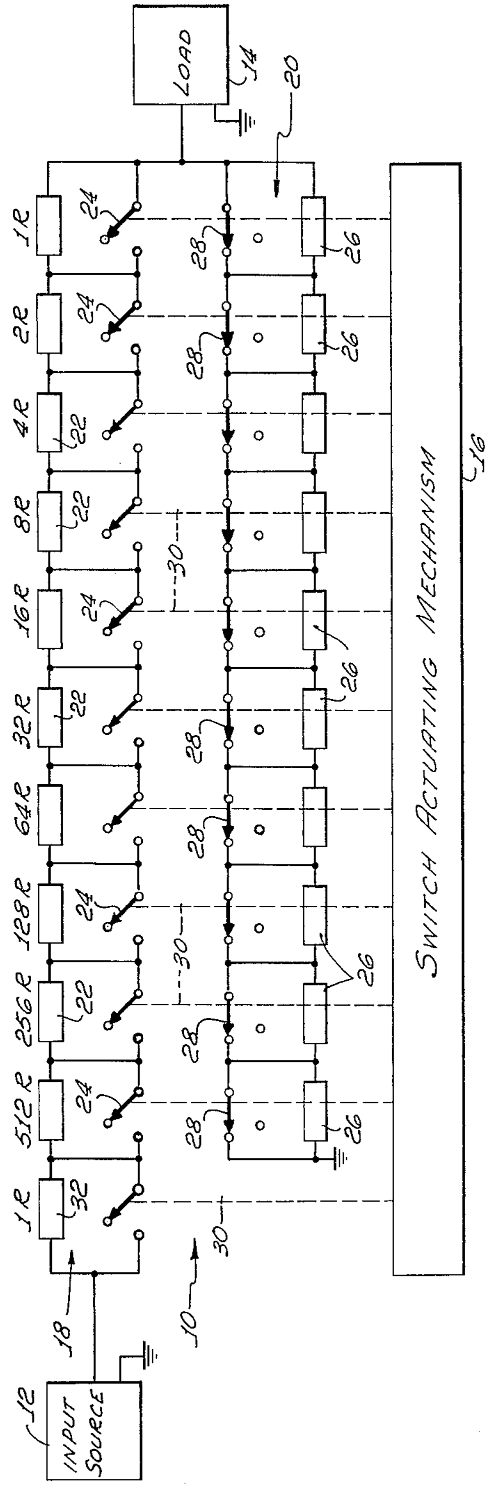
FIG. 1 is a schematic diagram of the voltage divider of the present invention.

In the drawing in FIG. 1, a voltage divider of the invention is indicated at 10 connected to an input source 12, a load 14, and a switch actuating mechanism 16. The voltage divider 10 is divided into a first circuit 18 and a second circuit 20. The first circuit 18 is adapted to be connected serially between the load 14 and the input source 12. The second circuit 20 is adapted to be connected between the load 14 and some point of reference potential, such as ground. The first circuit 18 comprises a plurality of serially connected impedance elements 22 and a plurality of open switches 24 to selectively short any one of the impedance elements 22. The second circuit 20 comprises an analogous set of impedance elements 26 serially connected between the load 14 and ground, and an analogous set of switches 28 for shorting the impedance elements 26. The switches 28 are adapted to be opened by switch actuating mechanism 16 to increase the total impedance from the load 14 to ground. Each switch 28 has a corresponding switch 24 and both are moved simultaneously by the switch actuating mechanism 16 as indicated by dotted line 30. A particular impedance element 32 in the first circuit 18 is not provided with a corresponding switch 28 or impedance element 26 in the second circuit 20. The impedance element 32 need not be so provided but may be to impress a voltage on the load 14 equal exactly to a binary fraction. The weight of the impedance of each of the elements 22 and corresponding elements 26 of the order of 1R, 2R, . . . $2^nR$ where R0 and $n=0, 1, 2, 3, \ldots p-1$, where $p$ is the total number of impedance elements in either the first circuit 18 or the second circuit 20. By using the binary coded impedance elements 22 and 26, a minimum of the impedance elements are required.

It is to be noted that as each switch 24 is closed to short a corresponding impedance element 22, a corresponding switch 28 is opened by the switch actuating mechanism 16 to increase the impedance of the second circuit 20 from the load 14 to ground. This means that the total impedance across the input source 12 is always constant, although the fraction of the voltage presented by the input source 12 is a binary fraction depending upon the combination of the switches 24 which are closed and the corresponding switches 28 which are opened. With all the switches in the positions shown, it is obvious that the voltage impressed upon the load 14 is zero.

Figure 2:
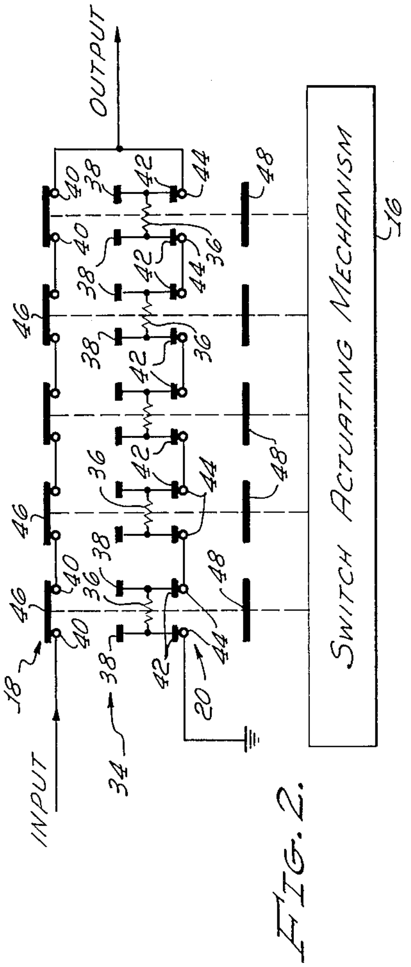
FIG. 2 is a schematic diagram of an alternative embodiment of the invention as shown in FIG. 1.

It is to be noted that only one of the impedance elements 22 and a corresponding one 26 is employed simultaneously. Hence, it becomes apparent that only one impedance element, which may be an inductor, capacitor or resistor, need necessarily be employed in the divider 10. An analogous construction is shown in a divider 34 in FIG. 2 where a resistor 36 is selectively connected serially with the first circuit 18 thereshown or the second circuit 20 shown below the first circuit. Each resistor 36 is provided with a pair of contactors 38 to contact corresponding terminals 40 in the first circuit 18. Similarly, the resistor 36 is provided with a pair of contacts 42 to contact corresponding terminals 44 in the second circuit 20. A shorting bar 46 is then mechanically connected to means supporting the resistor 36 as is a shorting bar 48, the shorting bar 48 being employed to short the terminals 40 when resistor 36 is connected serially with the terminals 44 and the shorting bar 48 being employed to short the terminals 44 when resistors 36 are connected serially with the terminals 40. The switch actuating mechanism 16 may again be employed to move the shorting bar 46 away from or in contact with the terminals 40 simultaneously with the movement of the contacts 38 in contactor away from the terminals 40 and the contacts 42 away from or in contact with, respectively, the terminals 44. When the resistor 36 and any corresponding shorting bar 46 and 48 are moved upwardly as viewed in FIG. 2, the shorting bar 48 will then obviously contact the terminals 44 and the resistor 36 will be connected serially with the terminals 40. When selected ones of the resistors 36 are connected serially with the first circuit 18, an output may be obtained from the divider 34 which is a binary fraction of the input signal. Switch actuating mechanism 16 thus determines this binary fraction. When all the resistors 36 are connected serially with the terminals 44 as shown in FIG. 2, it is obvious that the output signal will be exactly equal to the input signal.

Figures 3, 6:
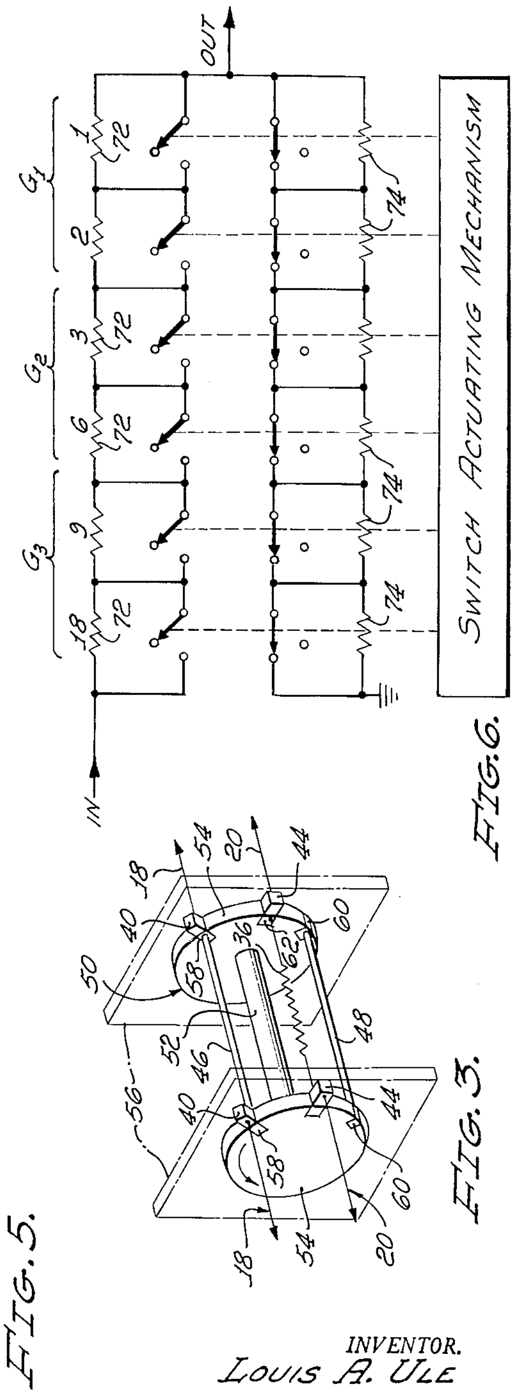
FIG. 3 is a perspective view of the switch mechanism shown in FIG. 2.
FIG. 6 is a schematic diagram of the invention with tertiary coded resistors.

Mechanical structure which may be employed to move the shorting bars 46, 48 and the resistor 36 with the two pairs of contacts 38, 42 is shown in FIG. 3. This structure comprises a spool 50 including a shaft 52 and a pair of disc-shaped end plates 54 which are rotatably mounted, and a pair of supporting plates 56. All the structure is preferably formed of dielectric material with the exception of the resistor 36, shorting bars 46, 48, terminals 40, 44, a pair of conductive blocks 58 embedded in the discs 54 to provide a good electrical connection between the shorting bar 46 and terminals 40, a similar pair of blocks 60 to provide a good electrical connection between shorting bar 48 and terminals 44, and another similar pair of blocks 62 to provide a good electrical connection between the resistor 36 and either the terminals 40 or 44. The series circuits 18 and 20 are indicated by appropriate arrows from corresponding terminals 40 and 44.

Figure 4:
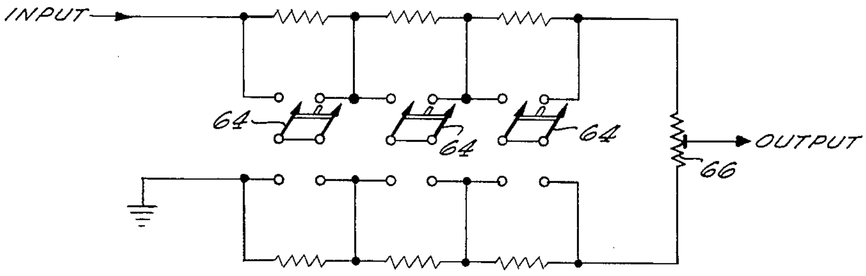
FIG. 4 is a schematic diagram of still another embodiment of the invention as shown in FIGS. 1 and 2.

In FIG. 4 a plurality of double poled, double throw switches 64 are shown. It is obvious that the switches 64 may be substituted for the switches 24 and 28 shown in FIG. 1. In this case the poles of the switches 64 are shorted. In FIG. 4 a conventional potentiometer 66 is connected at the output of the voltage divider of the invention. It is obvious that the potentiometer 66 may provide a fine adjustment for the output thereof, however, this adjustment will generally not be desirable nor needed since as for example, in FIG. 1 the output signal impressed upon the load 14 may be a fraction of the input signal provided by source 12 equal to increments as small as 1/1024.

Figure 5:
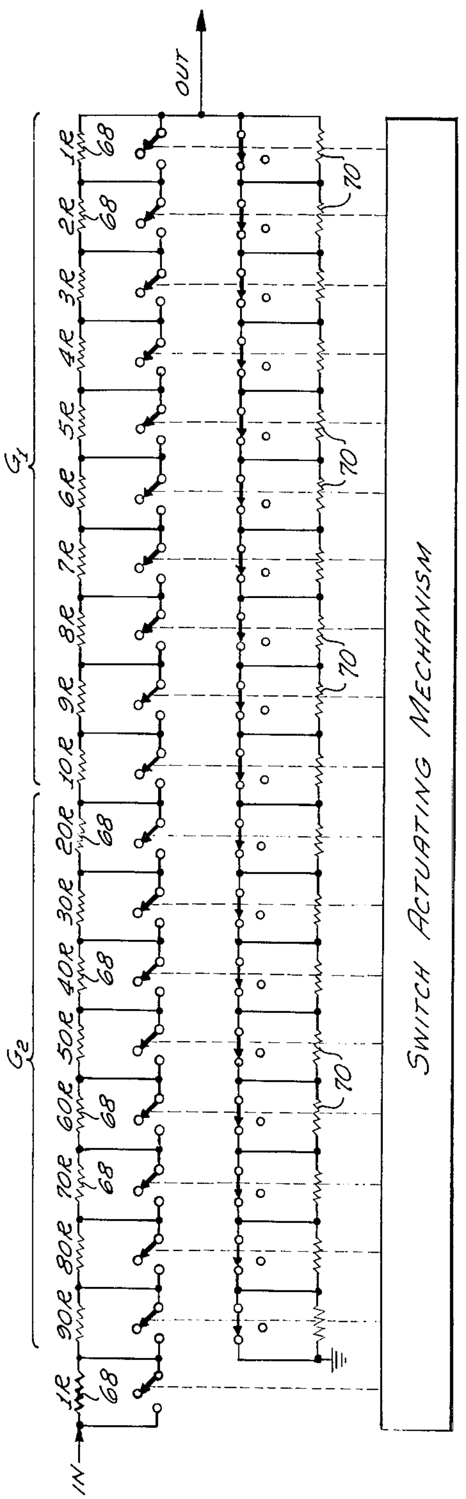
FIG. 5 is a schematic diagram of the voltage divider of the invention incorporating decimally coded resistors.

Impedance elements 22 and 26 as shown in FIG. 1 are binary coded. However, it is obvious that they may be decimal coded or tertiary coded as illustrated in FIGS. 5 and 6, respectively. In order to generalize on the coding of resistors 68, 70 and 72, 74 shown respectively in FIGS. 5 and 6, it will be noted that all resistors are arranged in $G_1$, $G_2$, $G_3$, . . . $G_n$ groups where $n$ is any positive integer. It is also to be noted that each of the groups contain the same number $p$ of resistors, the values of the resistor in any single group being in the proportion 1:2:3: . . . $p$. The impedance of any element in any group $G_k$ where $k$ is a positive integer equal to or less than $n$, is always a number of times M larger than a corresponding element in the preceding group $G_{k-1}$, M being equal to $p+1$. It will be obvious that this is the case for any type of coding system. Thus M is the counting modulus, viz. 2 of a binary, 3 for a tertiary, and 10 for a decimal code. Hence $p$ for the binary, tertiary and decimal codes is 1, 2, 9, respectively.

Figures 7, 8:
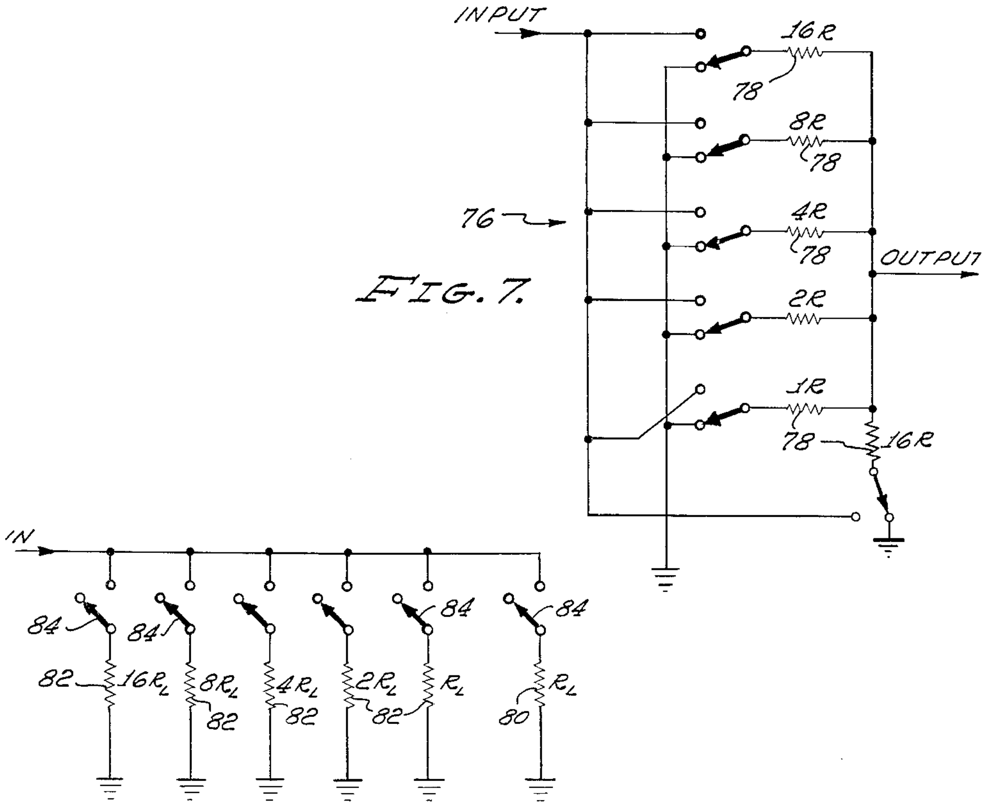
FIG. 7 is a schematic diagram of an alternative embodiment of the voltage divider shown in FIG. 1 which may be employed with the switch mechanism of the invention.
FIG. 8 is a schematic diagram of a current divider which may be employed with the switch mechanism of the invention.

It will be obvious to those skilled in the art that many other types of voltage dividers may be substituted for the voltage divider 10 or the other embodiments shown in FIGS. 2 through 6 without departing from the true scope of the invention, including the switch mechanism 16 which is shown in greater detail in FIGS. 9, 10, 11 and 12. For example, a voltage divider 76 is shown in FIG. 7 providing a constant output impedance and a certain minimum input impedance, this being based on the assumption that input source 12 will be connected thereto, a source 12 having relatively low impedance compared to any of the values of a plurality of resistors 78 shown in the voltage divider 76 of FIG. 7. Preferably the resistor 78 will be binary coded as shown and having a resistance in proportion 1R, 2R, . . . $2^{p-1}$R. Analogously a current divider may be employed as illustrated in FIG. 8, where a resistor 80 is illustrated as a load resistor and a plurality of resistors 82 are connected parallel therewith to corresponding switches 84.

Figures 9, 10, 11, 12:
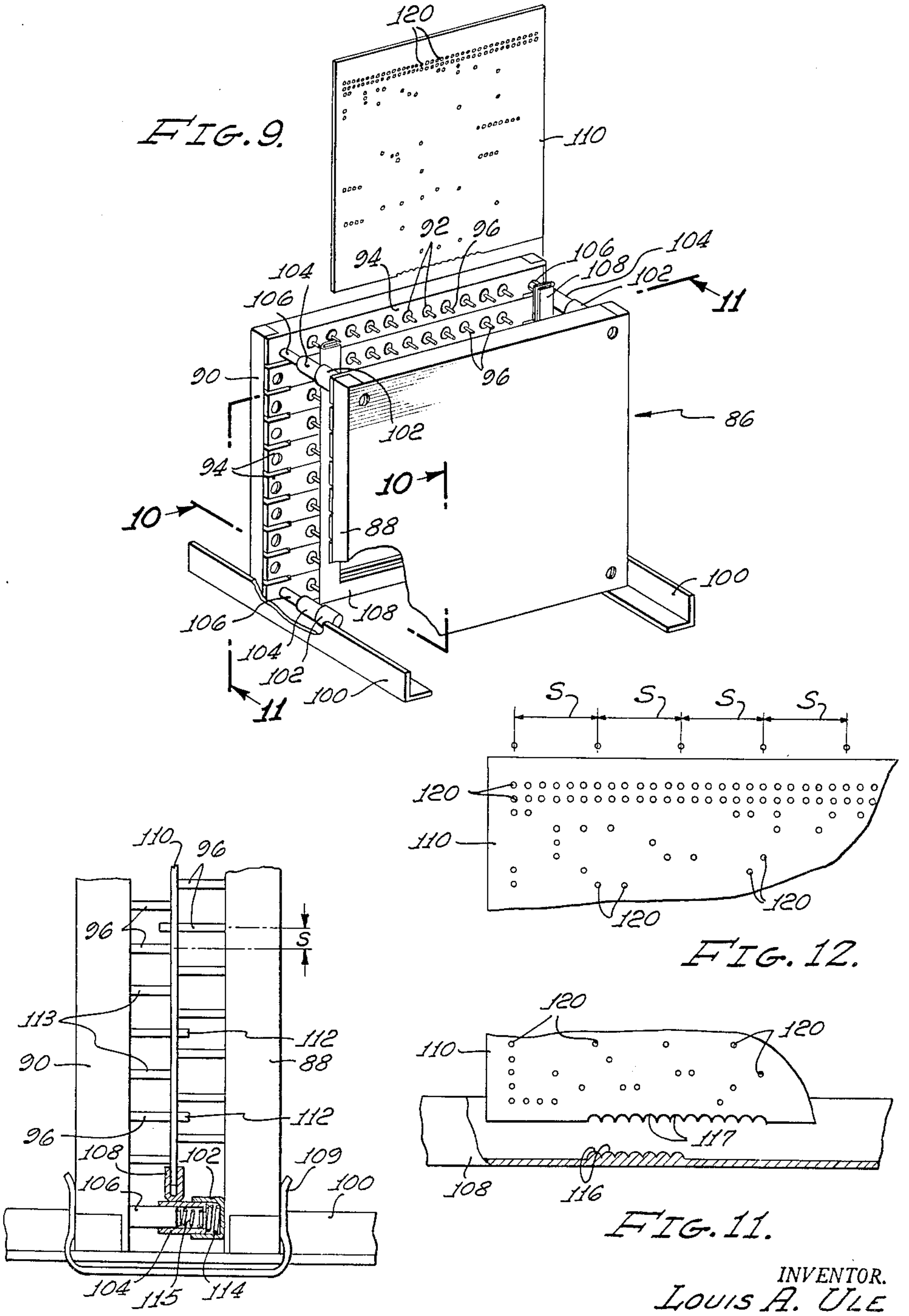
FIG. 9 is a perspective view of a plurality of switches and a switch actuating mechanism constructed in accordance with the invention.
FIG. 10 is a sectional view taken on the line 10—10 as shown in FIG. 9.
FIG. 11 is a broken away sectional view of parts supporting structure taken on the line 11—11 as shown in FIG. 9.
FIG. 12 is an enlarged broken away front elevational view of a switch actuating card shown in FIG. 9.

A switch mechanism 86 is shown in FIG. 9 comprising a pair of frame members 88 and 90 to support a bank of switches 92 arranged and mounted in rectangular housing 94 fixed to the frames 88 and 90. The switches 92 are provided with actuating pins 96 to move into the housing 94. A bank of switches 92 are also mounted in the frame 88 but they cannot be seen in the perspective taken in FIG. 9. The frames 88 and 90 are movable toward each other on a pair of angle irons 100. The frames 88 and 90 are preferably urged away from each other by springs, not shown in FIG. 9, mounted within four larger telescoping members 102 fixed at the corners thereof, and within four intermediate telescoping members 104 disposed in the larger members 102. A telescoping rod 106 is then fixed to each of the corners of the frame 90 to project into a corresponding intermediate telescoping member 104. A U-shaped member 108 is fixed to each of the intermediate telescoping members 104. The U-shaped member 108 preferably has a channel-shaped cross section to receive a card 110 having perforations 120 therein. The perforations 120 are of a diameter to permit the projection of the pins 96 therethrough. When no perforation 120 is provided for a particular pin 96, the switch 92 corresponding to the pin will be actuated. The card 110 is then inserted vertically downward into the U-shaped member 108. As shown in FIG. 10 the members 88 and 90 are urged toward each other and clamped there by means of suitable clamping means such as a pair of clamps 112 which may be disposed at the top and bottom or along the sides of the members 88 and 90. It is to be noted that the pins 96 on the member 90 are staggered with respect to the position of the pins 96 on the member 88. This permits the mounting of an unusually large number of switches in a relatively small space. It is also noted that several of the pins such as the pins 112 project through the card whereas some of the pins 113 do not. The switches 92 connected to the pins 112 thus are not actuated and the switches connected to the pins 113 are actuated. A spring 114 is shown inside the large telescoping member 102 and a spring 115 is shown disposed inside the intermediate telescoping member 104.

In FIGS. 11 and 12 the card 110 is shown. In FIG. 11 the member 108 is shown having a plurality of relief portions 116 to set the card 110 in a particular horizontal or transverse position. The card 110 is accordingly provided with recesses 117 to receive the relief portions 116 at the bottom of the channel forming the member 108. The horizontal adjustment of the card 110 may provide a plurality, for example, 6 alternative settings for a plurality of corresponding voltage dividers in a single system. For example, considering each of the housings 94 in FIG. 1 to be a complete voltage divider, with a single card such as the card 110, six alternative settings may be provided on one card for twenty voltage dividers constructed in accordance with one of the embodiments of the invention shown in FIGS. 1 through 8.

The distance $s$ as shown in FIGS. 10 and 12 represents the distance between a pin 96 on the frame member 90 to a corresponding pin on the member 88 directly adjacent the pin in the member 90. Although according to the embodiment of the invention shown in FIGS. 11 and 12, no vertical adjustment is provided, such a vertical adjustment may be easily provided so that thirty-six adjustments for the twenty voltage dividers of FIG. 9 may be set to almost any selected one of several predetermined settings, these settings being determined by the manner in which the card 110 is punched.

The structure referred to as 110 has heretofore been called a card. It is to be noted that the card can be any member having perforations or depressions and can be made out of any convenient material. It may also have a curved rather than a flat surface.

Another switch actuating mechanism is shown in FIG. 13 comprising a pair of dielectric supporting members 121 and 122 bolted together with bolts 124 which are provided with nuts 126. Preferably, the member 121 is provided with projections 128 to keep the central portions of both members 121 and 122 spaced apart. The projections 128 are employed to provide space in which to slide a card 130 between the members 121 and 122. Holes 140 and 142 are provided in the members 121 and 122, respectively, to receive the bolts 124. A plate 132 is preferably fixed to the bottom of the members 121 and 122 to prevent the card 130 from slipping through the space between the members 121 and 122. The plate 132 may thus be provided with apertures 134 to receive screws 136, a pair of screws being employed to attach the plate 132 to the underside of each of the members 121 and 122 as shown in FIG. 14. The member 121 is provided with a pair of conductive terminals, such as a pair of conductive terminals 138 which may be made of copper, for each impedance element employed in the voltage divider network used therewith. Shorting elements 144 are resiliently mounted in member 122 and urged outwardly therefrom. The shorting elements 144 are preferably made of copper and have a substantially circular cross section with a hemispherical end surface.

Card 130 is provided with circular apertures 146 to receive the shorting elements 144. It is thus seen that according to the manner in which the card 130 is constructed, selected ones of the shorting elements 144 may project therethrough and short selected pairs of the terminals 138.

Although the shorting elements 144 need not project through the rear surface of the member 122, preferably the shorting terminals 138 do project through the rear surface of the member 120 as shown in FIG. 15, where an impedance element 146 is connected between each pair of the terminals 138.

A side elevation of the terminals 138 is shown in FIG. 16. A plan side elevational and front elevational view of a particular shorting terminal 148 are shown in FIGS. 17, 18, and 19, respectively, to illustrate a curvature 150 on the front edge of each of the terminals 138 to permit the projection of a corresponding shorting element 144 between each pair of the terminals 138 corresponding to a particular impedance element, such as, for example, each resistor 146. The manner in which a shorting element 144 engages a pair of terminals 138 through an aperture 146 in card 130 is shown in FIG. 20 where the resistor 152 of those indicated generally as 146 in FIG. 15 is shown connected between a pair of terminals 154 of the group 138 shown in FIGS. 14, 15, and 16 in the member 121. A particular shorting element 158 is shown in contact with the terminals 154, the shorting element 158 projecting through an aperture 156 in the card 130. Member 122 is provided with a recess 164 to receive shorting element 158 and a spring 166 to urge the shorting element 158 outwardly toward an engagement with the terminals 154.

Shorting element 158 is prevented from passing out of the recess 164 by a shoulder 162 therein which bears against a flange 160 on the right end of the shorting element 158. A perspective view of the shorting element 158 with the flange 160 is shown in FIG. 21.

FIG. 22 is a section substantially identical with the section shown in FIG. 20 with the exception that as shown, the card 130 is not provided with the aperture 156 or any aperture. It is to be noted that the spring 166 is compressed and the shorting element 158 has been pushed into the recess 164.

Another embodiment of the invention is shown in FIG. 23 comprising the same members 121 and 122, terminals 138, element 168, recess 164, and spring 166. It is to be noted that each pair of terminals 138 are connected as shown in FIG. 15, however, two adjacent pairs of terminals 168 are not connected except by a material 170 on a card 172. The card 172 is different from the card 130 in that no perforations are provided in the card 172. The material 170 may be either a printer resistor material, a printed conductor, i.e. a copper strip, or an etched conductor. This means that, depending upon the configuration and the number of coatings 170 on the card 172, any desired output may be provided for any number of voltage dividers incorporated in the member 121. The member 158 is employed simply to press the material 170 against terminals 168 to make good contact therewith. The card 172 is preferably made of a dielectric material as is the card 130. Other means may, of course, be substituted for the element 158 and spring 166, the function of these two structures being simply yieldingly to urge the card 172 in contact with the terminals 138.

Alternatively, if all the isolated areas are coated with only a conductive material 170, e.g. copper, it will generally be necessary to provide a resistor between terminals 168 and other like corresponding terminals in the member 121 as illustrated in FIG. 24 where resistor 174 is connected between terminals 168. It is to be noted that with respect to the invention as illustrated in FIGS. 13, 20, 22, 23, and 24, means such as the means shown in FIG. 11 may also be provided to set ten or even one hundred potentiometers simultaneously by providing means to locate the card 130 or the card 172 in any one of several transverse positions, the apertures 146 or the terminals 138 being so located so that one card 130 or one card 172 may be provided with several apertures 146 or coatings 170, respectively, between pairs of terminals 138. Thus, for example, plate 132 may be provided with means similar to that of relief portions 116 in channel 108 shown in FIG. 11.

It is thus seen that any of the embodiments of the invention may be made with extreme precision, but at reasonable cost. The embodiments of FIGS. 1, 2 or 4 may then be employed as a highly accurate substitute for a conventional potentiometer having a constant input impedance. Switching devices of FIGS. 2 and 3 may also concurrently be employed to obviate the necessity of using one-half the impedance elements shown in FIG. 1.

The switch actuating mechanism 16 of FIGS. 9, 13, 23 and 24 may also be employed to set one or more networks constructed according to any one of the above-described embodiments of the invention, as indicated previously. Along this same line, it is to be noted that the input to the switch actuating mechanism 16 or to any similar device may be a switching function variable with time although that will not generally be provided. It is also worth of note that the output of input source 12 or an equivalent thereof will generally be a variable function of time. However, both the output of source 12 and the input of switch actuating mechanism 16 may be constant or variable or either one may be variable and the other constant, and the invention should not be so limited. Other changes and modifications of the invention will, of course, suggest themselves to those skilled in the art. Hence, the invention is not to be considered limited by or to the specific description of the particular embodiments of the invention shown in the drawings since the true scope thereof is defined only in the appended claims.

What is claimed is:

1. A translation device for passing a selected fraction of a signal to a load, said device comprising: a plurality of circuits, a plurality of impedance elements corresponding to each circuit, a switch mechanism for each impedance element to connect any one or more of said impedance elements into the corresponding circuit of each, each of said switch mechanism including an actuating pin, at least a portion of said switches being disposed in a bank, the actuating pins of said bank of switches projecting outwardly therefrom, a perforated member, first means to maintain said member in any one of several transverse positions, whereby the total impedance of each of said circuits may be fixed according to one of several alternative positions of said member, and second means to clamp said member to said bank of switches, whereby selected actuating pins may project through the perforations of said member and others are moved effectively by the lack of perforations at the relative positions of said other actuating pins, two input terminals, said plurality of circuits including first and second circuits connected serially with each other between said two input terminals, the load being connected in parallel with one of said circuits, said switch mechanisms being adapted to change selectively the impedance of each of said circuits by connecting any one or more of said elements serially in one of said circuits and the remainder of said elements serially in the other.

2. The invention as defined in claim 1, wherein each of said impedance elements comprises a pair of resistors connected serially in each of said circuits and wherein each of said switch mechanisms is provided with means to short selectively one resistor in each of said pairs of resistors.

3. The invention as defined in claim 1, wherein there is provided $G_1$, $G_2$, $G_3$, . . . $G_n$ groups of impedance elements where $n$ is any positive integer, each of said groups including the same number $p$ of said impedance elements, the elements of any single group having relative impedances in the proportion 1:2:3: . . . $p$, the impedance of any element in any group $G_k$, where $k$ is a positive integer equal to or less than $n$, always being a number of times M larger than a corresponding element in the preceding group $G_{k-1}$, M being equal to $p+1$.

4. A translation device for passing a selected fraction of a signal to a load, said device comprising: a plurality of circuits, a plurality of impedance elements corresponding to each circuit, a switch mechanism for each impedance element to connect any one or more of said impedance elements into the corresponding circuit of each, each of said switch mechanisms including an actuating pin, at least a portion of said switches being disposed in a bank, the actuating pins of said bank of switches projecting outwardly therefrom, a perforated member, first means to maintain said member in any one of several transverse positions, whereby the total impedance of each of said circuits may be fixed according to one of several alternative positions of said member, and second means to clamp said member to said bank of switches, whereby selected actuating pins may project through the perforations of said member and others are moved effectively by the lack of perforations at the relative positions of said other actuating pins, said first means including a horizontally disposed channel to receive the lower edge of said member, and position means in said channel, said member being adapted to receive said position means, whereby said member may be accurately aligned in any selected one of said several alternative positions.

References Cited in the file of this patent

UNITED STATES PATENTS

| | | |
|---|---|---|
| 1,905,741 | Oliver | Apr. 25, 1933 |
| 2,036,084 | Roder | Mar. 31, 1936 |
| 2,114,330 | Borden | Apr. 19, 1938 |
| 2,558,707 | Janssen et al. | June 26, 1951 |
| 2,715,703 | Schuck | Aug. 16, 1955 |
| 2,752,093 | Bush et al. | June 26, 1956 |
| 2,762,038 | Lubkin | Sept. 4, 1956 |
| 2,784,369 | Fenemore et al. | Mar. 5, 1957 |
| 2,790,114 | Perkins | Apr. 23, 1957 |